(12) United States Patent
Korhonan et al.

(10) Patent No.: US 6,848,238 B2
(45) Date of Patent: Feb. 1, 2005

(54) PROCEDURE AND APPARATUS FOR WRAPPING A FODDER BALE WITH PLASTIC

(76) Inventors: Onni Korhonan, Kirvestie 18, FIN-00760 Helsinki (FI); Matti Sirkka, Kirjurintie 16, FIN-44280 Sumiainen (FI)

( * ) Notice: Subject to any disclaimer, the term of this patent is extended or adjusted under 35 U.S.C. 154(b) by 0 days.

(21) Appl. No.: 10/240,829

(22) PCT Filed: Apr. 6, 2001

(86) PCT No.: PCT/FI01/00344

§ 371 (c)(1), (2), (4) Date: Feb. 19, 2003

(87) PCT Pub. No.: WO01/76353

PCT Pub. Date: Oct. 18, 2001

(65) Prior Publication Data

US 2003/0175096 A1 Sep. 18, 2003

(30) Foreign Application Priority Data

Apr. 7, 2000 (FI) .............................. 20000840
Sep. 4, 2000 (FI) .............................. 20001934

(51) Int. Cl.⁷ ................................ B65B 11/04
(52) U.S. Cl. .......................... 53/399; 53/441
(58) Field of Search ................. 53/399, 441, 372.9, 53/556, 587, 588

(56) References Cited

U.S. PATENT DOCUMENTS

| | | | | |
|---|---|---|---|---|
| 1,714,532 A | * | 5/1929 | Walter .................. | 53/587 |
| 3,924,375 A | * | 12/1975 | Brenner et al. ............ | 53/370.3 |
| 4,362,001 A | * | 12/1982 | Cockerham et al. .......... | 53/441 |
| 4,409,776 A | * | 10/1983 | Usui ........................... | 53/399 |
| 4,821,489 A | * | 4/1989 | MacLeod et al. ............. | 53/587 |
| 4,905,448 A | * | 3/1990 | Plitt ........................... | 53/588 |
| 5,174,095 A | * | 12/1992 | Fujiwara et al. ........... | 53/372.9 |
| 5,195,301 A | * | 3/1993 | Martin-Cocher et al. ..... | 53/441 |
| 5,442,893 A | * | 8/1995 | Soderberg .................... | 53/556 |
| 5,450,711 A | * | 9/1995 | Martin-Cocher ............. | 53/556 |
| 5,463,842 A | * | 11/1995 | Lancaster .................... | 53/441 |

FOREIGN PATENT DOCUMENTS

| | | |
|---|---|---|
| DE | 4201485 A1 | 7/1993 |
| DE | 42 27 145 A1 | 2/1994 |
| EP | 0543792 A2 | 5/1993 |
| EP | 0865722 A1 | 9/1998 |
| FI | 933143 | 1/1995 |
| GB | 2204850 A | 11/1988 |
| GB | 2 269 795 A | 2/1994 |
| SE | 467248 B | 6/1992 |

* cited by examiner

Primary Examiner—John Sipos
(74) Attorney, Agent, or Firm—Birch, Stewart, Kolasch & Birch, LLP

(57) ABSTRACT

The invention relates to a procedure for wrapping a straw fodder bale with plastic. In the wrapping operation, to wrap the corner between the envelope surface and the end surface of the bale, the axis of rotation of the plastic roll is turned from an upright position into a substantially horizontal position and the bale is rotated so that the plastic film being stretched on the bale from the plastic roll (16) is caused to bend over the corner of the bale partly onto the envelope surface and partly onto the end surface of the bale.

8 Claims, 3 Drawing Sheets

PROCEDURE AND APPARATUS FOR WRAPPING A FODDER BALE WITH PLASTIC

This application is the national phase under 35 U.S.C. §371 of PCT International Application No. PCT/FI01/00344 which has an International filing date of Apr. 6, 2001, which designated the United States of America.

FIELD OF THE INVENTION

The present invention relates to a procedure as defined in the preamble of claim 1 and to an apparatus as defined in the preamble of claim 4 for wrapping a green fodder bale with plastic.

DESCRIPTION OF THE BACKGROUND ART

In prior art, wrapping machines for wrapping a round bale are known in which a plastic film is wound around a rotating bale so that, at the end of the wrapping operation, the bale has a plastic film wrapped around it as tightly as possible, the wrapping completely enclosing the bale. The equipment in prior-art solutions includes picking means for picking up a bale from the ground, a wrapping table rotating the bale, a wrapping arm revolving around the bale and provided with a roll of plastic film, a plastic film holder and a plastic film cutter. A known solution is presented in Finnish patent no. 91123, which corresponds to European patent EP0499285.

In previously known solutions, the bale is rotated on a wrapping table about its longitudinal axis in a substantially horizontal position while the wrapping arm, provided with a plastic film roll with a substantially upright axis of rotation, is revolved at the same time about the bale in a horizontal plane. The idea is to surround the bale with a plastic layer as impermeable as possible that will admit no air into the bale. To achieve a sufficiently impermeable layer, at least a four-fold, preferably six-fold plastic layer is needed on the envelope surface of the bale. In addition, the bale is wrapped with individual layers overlapping each other. Due to this known wrapping method, the plastic layers are laid on the bale in the manner shown in FIG. 1. An acceptable layer thickness on the envelope surface of the bale is achieved, but at the same time much too much plastic is accumulated on the end surface of the bale. Especially the central part is covered with as many as 30-40 plastic layers. This means wasting large amounts of expensive plastic. This is one of the drawbacks of prior-art solutions.

Another drawback with known solutions is that there are generally stalks sticking out of the edges of the envelope surface so that the ends of the stalks are pressed against the plastic. The drier the hay is allowed to become before being wrapped, the more damage will the stalk ends inflict on the plastic during wrapping as they stretch the plastic in the stalk end area so that it becomes very thin or is even pierced. Therefore, the total thickness of the plastic layer is not sufficient.

Another disadvantage with prior-art solutions is that, as the volume of the bale is diminished during storage because of fermentation storage loss, the bale shrinks, with the result that the plastic film wrapped longitudinally on the envelope surface becomes loose. The bale volume is reduced during storage by as much as 30% and the bale is deformed at the same time. The plastic layer becoming thinner and loose leads to several problems. First, it permits the entry of air into the bale, increasing fermentation of the fodder and the risk of its contracting mould. In addition, the stretched and slackened plastic on the soft envelope surface of the bale is easily pierced by stubble and other sharp objects on the grassland.

BRIEF SUMMARY OF THE INVENTION

The object of the present invention is to eliminate the above-mentioned disadvantages and to achieve a reliable and easy-to-use procedure and apparatus for wrapping a fodder bale with plastic.

The solution of the invention provides the advantage that, thanks to a new wrapping method, less plastic is used while at the same time producing a durable plastic layer around the bale. The reduction in the amount of plastic needed is about 30-40% as excessively thick plastic layers at the ends of the bale are avoided. Another advantage is that, when the plastic film is passed over the corner of the envelope surface of the bale in the manner provided by the invention, stalk ends sticking out will not damage the plastic as in previously known methods but are readily bent under the plastic without stretching it. As a result, the quality of the wrapping and therefore also the quality of the fodder are improved, both because the plastic at the corners of the bale is more durable and because drier bales can be wrapped, thanks to the improved durability. A further advantage is that the new wrapping method produces a more compact surface layer of the bale envelope because the envelope of the bale can be more effectively compressed with the plastic as the plastic film is wound in a different direction. Therefore, between the plastic film and the fodder there remains no air, which would impair the fodder quality as a result of a breathing and fermenting reaction. A further advantage is a hard envelope surface, which is made very compact and seamless by the laminating action of the wrapping table and rollers. Because the plastic is tightly stretched about the bale when the envelope surface is being wrapped, the bale retains its shape and the plastic remains impermeable and tight around the bale throughout the storage period even if the size of the bale is reduced. A bale with a hard envelope surface according to the invention can resist stubble and other sharp objects on the grassland much better during handling than a bale with a soft envelope surface wrapped in the traditional manner. An additional advantage is that the distance between the plastic rolls and different parts of the bale is hardly varied at all during the wrapping operation, which means that only slight transverse stretching weakening the plastic occurs, especially at the envelope surface and corners of the bale. A further advantage worth mentioning is that the invention allows stepless variation of the overlap of the plastic layers in the range of 0-100%.

To sum up the advantages of the solution of the invention, it can be stated that, by producing a better wrapping result than previously known solutions, the invention reduces the risk of mould while allowing fodder of a better quality to be produced at a lower cost and with a reduced consumption of plastic.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be described in detail by the aid of an embodiment example with reference to the attached drawings, wherein.

DETAILED DESCRIPTION OF THE INVENTION

Figure 1:
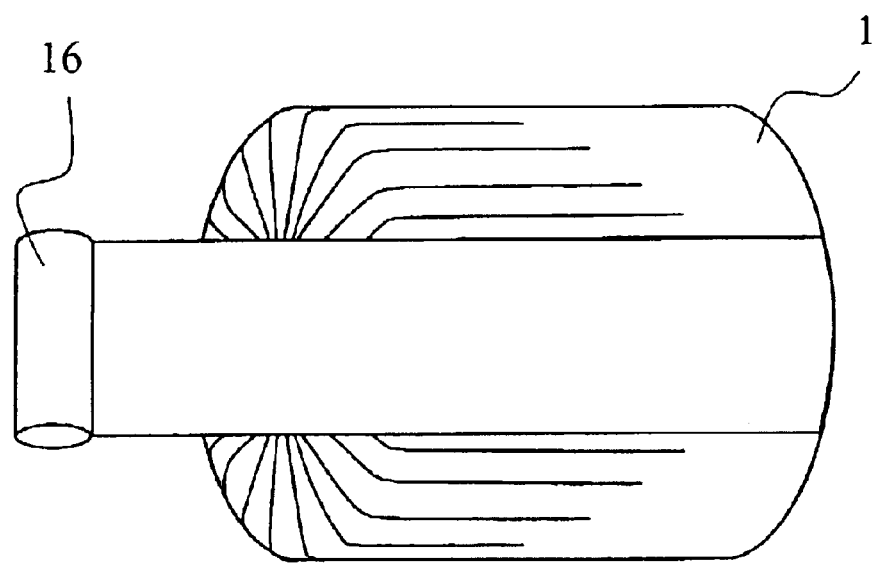
FIG. 1 presents a known solution for wrapping a fodder bale with plastic as seen from the side of the bale.

First, the apparatus of the invention will be described, making it easier to understand the method. The solution of the invention can be used in many different wrapping applications. In this example, the solution of the invention is described as used in a wrapping apparatus for so-called round bales, moving on its own wheels and pulled by a suitable machine. The basic component of the frame of the apparatus consists of a tow bar 2 with wheels 4 at its rear end. Extending between the front end of the tow bar and the wheels is an upper support arm 5 rising from the tow bar and forming a rearward curvature, with a wrapping arm 15 pivotally connected to its rear end. The wrapping arm is bent downward so that it can revolve horizontally about the bale 1 without hitting the upper support arm. The wrapping arm is revolved by means of a drive mechanism 33 and a transmission element 14. Mounted at the lower end of the wrapping arm is a plastic film roll 16 containing plastic film to be stretched about the fodder bale. The frame of plastic roll is connected to the lower end of the wrapping arm by a point midway between the ends of the axis of rotation of the plastic roll, so the axis of rotation can be turned between a horizontal position and a vertical position about a joint 18 at the lower end of the wrapping arm by means of an actuator 17.

The rear part of the frame is provided with lugs 7 for a wrapping table 3. The wrapping table may be immovable, but in this example it can be tilted by a power means 41 into an inclined position to allow a bale to be picked up or removed. Pivoted by their ends on the side beams are two turning rollers 10 and 13, with at least one belt 11 stretched around them so as to form a concave pocket for the fodder bale 1. Turning roller 10 is a driving roller, receiving its energy from a hydraulic motor 26. The front edge of the table is additionally provided with a guard 12 to prevent the bale from falling over the front edge of the table. For picking up a bale from the field, the wrapping table comprises two picking devices 6 pivotally mounted on its rear corners, the picking action of the devices being implemented using a power means 9.

Mounted on each side at the front edge of the wrapping table is guide roller 19 freely rotatable about its longitudinal axis, the function of which is to press the plastic film being bent over the corner of the bale tightly against the end surface of the bale. The axis of the guide roller is substantially parallel to the plane of the end surface of the bale. In addition, placed on each side of the wrapping table at its front edge is a freely rotatable pressure roller 20 mounted at an oblique position as seen from above the bale with respect to the horizontal axis of rotation of the bale and thus also with respect to its end and envelope surfaces. The pressure roller 20 is spring-loaded, with a spring pressing the pressure roller against the edge between the envelope surface and the end surface of the bale during the wrapping operation. For the sake of clarity, the supporting structures of the guide and pressure rollers have been omitted from the drawings. The advantage achieved is a better wrapping result, because both the guide roller and the pressure roller guide the plastic film in an optimal manner over the corner of the bale.

Figure 3:
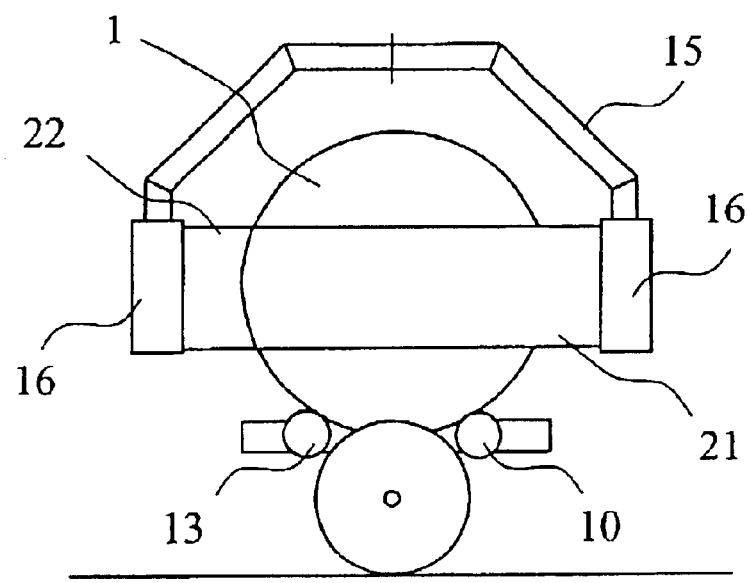
FIG. 3 illustrates a first step in a wrapping operation according to the invention, as a lateral view of a simplified apparatus provided with a double wrapping arm.
Figure 2:
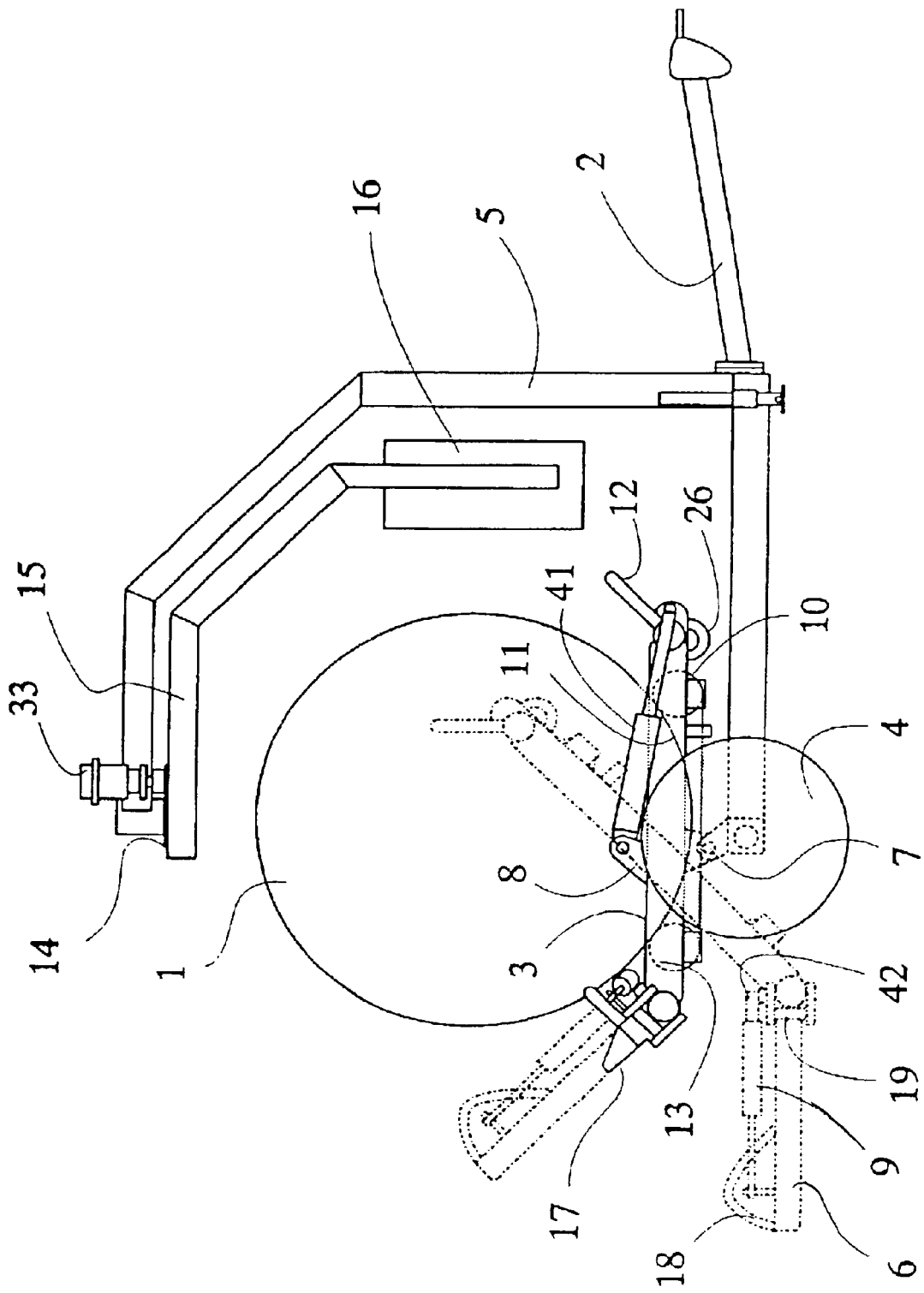
FIG. 2 presents a lateral view of a wrapping apparatus performing a wrapping operation.
Figure 4:
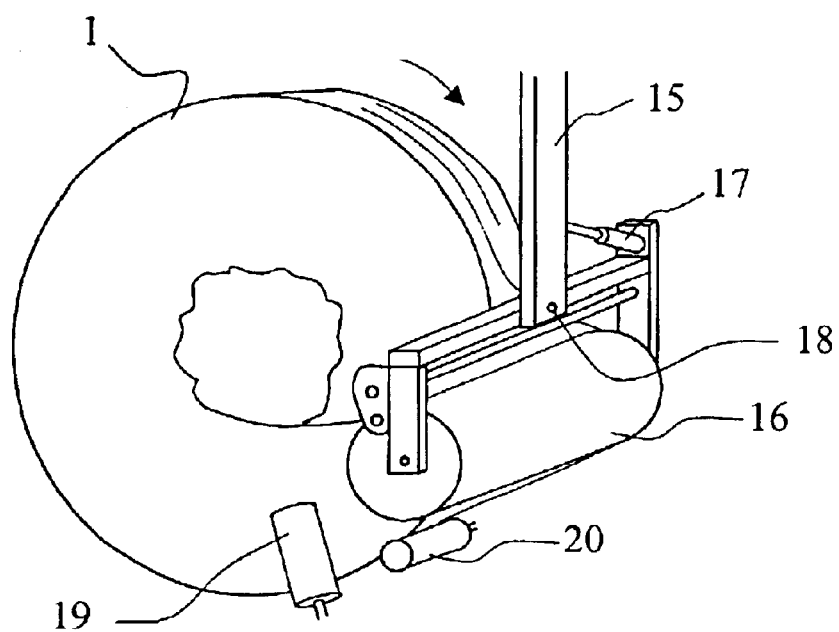
FIG. 4 illustrates the transition over a corner in a wrapping operation according to the invention, as seen from the end of the bale.

In the procedure of the invention, the bale is treated as follows. The working cycle can be regarded as starting from the situation presented in FIG. 2, where a bale 1 has been lifted onto the wrapping table 3 and the plastic roll 16 is in an upright position. In a first step of the wrapping operation, at least one lap turn is wound around the bale by revolving the upright plastic roll 16 by means of the wrapping arm 15 in a horizontal plane about the immobile bale. In this way, besides covering the end surface, a good gripping surface is achieved for keeping the plastic film fast when the wrapping direction is changed. If it is desirable to have more plastic at the end surface, then it is possible to wrap two layers about the bale with a small coverage, with an overlap of e.g. about 20%. In this case, the bale has to be rotated in the traditional manner during the wrapping operation. FIG. 3 illustrates the first step in the wrapping procedure.

Figure 5:
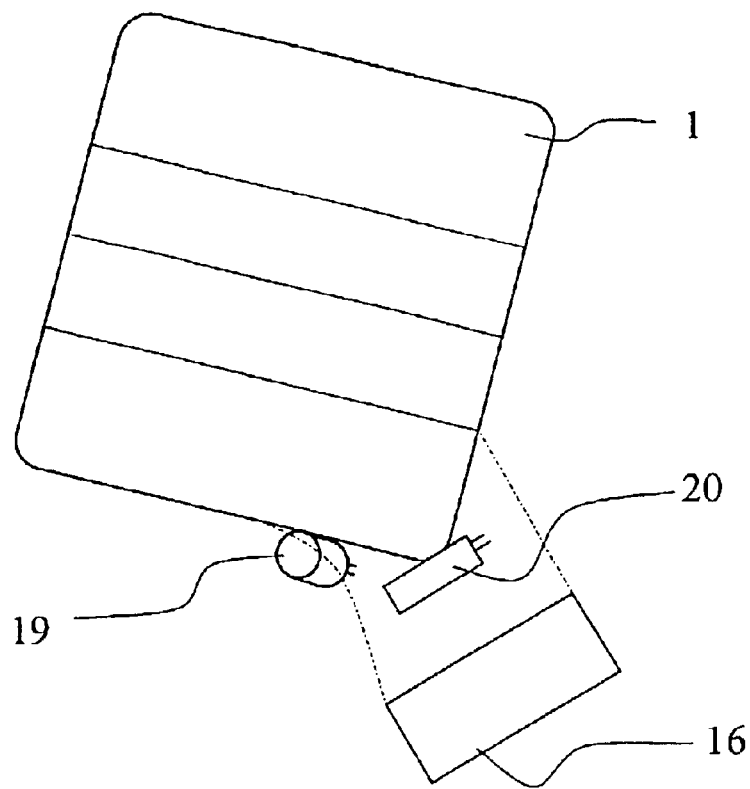
FIG. 5 illustrates the transition over a corner in a wrapping operation according to the invention, as seen from above the bale.

After this, a second step in the wrapping procedure is started. The plastic roll 16 is placed at the edge of the bale and turned substantially into a horizontal position so that part of the plastic roll extends outside the plane of the bale end. Seen from above, the plastic roll 16 is now at an angle of about 45° relative to the side and end of the bale, as shown in FIG. 5. This advantageous position of the plastic roll is achieved without using any extra auxiliary equipment, because the plastic roll is mounted on a wrapping arm 15 revolving horizontally about the bale and having its vertical axis of rotation substantially at the center of the bale as seen from above. When the wrapping arm is in this position relative to the bale, the plastic roll is automatically in the correct position. The turning operation can be performed either smoothly starting before the above-mentioned location or at once when the plastic roll is already at this location. The rotation of the bale about its horizontal axis is now started, whereupon the plastic film is stretched over the corner of the bale so that a portion of the film is pressed against the end surface while another portion of it is pressed against the envelope surface of the bale. The relationship between these portions is e.g. about half and half. Due to the oblique position of the plastic roll, the plastic film is pressed tightly against the end surface of the bale. The guide roller 19 and the pressure roller 20 provide an additional effect pressing the plastic tightly against the bale. After this, the plastic roll 16 is revolved by means of the wrapping arm substantially in a horizontal plane while the axis of rotation of the plastic roll itself is also substantially in a horizontal plane. At the same time, the bale is rotated about its horizontal axis, with the result that the plastic film is evenly stretched over the entire envelope surface of the bale. The rotary movements of the wrapping arm and the bale are so synchronized that a desired overlap on the envelope surface is achieved. A suitable overlap is an 80-% coverage, in which case the envelope surface can be covered with at least four layers of plastic in a single wrapping cycle. When the plastic roll 16 reaches the other edge of the bale, it is again driven somewhat past the end plane of the bale into an oblique position with respect to the bale in the same as at the first end, and the plastic film is allowed to be stretched over the corner of the bale both onto the edge of the envelope surface and onto the end surface of the bale in the same way as at the first end. Stalk ends sticking out of the edge of the bale are now also bent under the plastic film. The guide roller 19 and the pressure roller 20 again provide an auxiliary effect guiding the plastic film about the corner.

After this, a third wrapping step is started. The plastic roll 16 is again turned into an upright position either at once or slowly by simultaneously turning the wrapping arm about the bale. In the latter alternative mode of operation, the plastic film settles better on the bale after the corner has been passed. Finally, the wrapping arm is again revolved about the bale in the known manner through as many revolutions as necessary. At this phase, e.g. one layer with a coverage of 10–20% and in the same direction is needed, allowing the ends and the rest of the bale to be well and coherently closed.

After the bale has been wrapped up, the pressing arm of a plastic cutter is raised up and the wrapping arm is driven into its position of readiness so that during the last revolution the plastic film goes around the pressing arm of the plastic cutter. The pressing arm is again lowered, crimping the plastic in the direction of the plane of the plastic film, pressing it against a stop piece and severing the plastic film so that the plastic remains gripped between the stop piece and the plastic roll on the wrapping arm. After the plastic film has been severed, the bale is free to be dropped off the wrapping table.

It is obvious to the person skilled in the art that the invention is not limited to the example described above, but that it may be varied within the scope of the claims presented below. Thus, for example, the structure of the apparatus may differ from that described above. Likewise, the wrapping operation can be controlled in different ways. The wrapping may be performed manually or it may be based on computer control or some other corresponding type of automatic control. E.g the rotation of the bale in the second step of the wrapping procedure may be started by an automatic system simultaneously with the transition to the second step. Similarly, the control may be so implemented that the bale will rotate slowly starting from the first step, and after the plastic rolls have been turned into the horizontal position in the second step, the speed of rotation of the bale is increased, which, as the wrapping is performed in this direction, can be done without impairing the quality of the wrapping. The result is a considerable acceleration of the wrapping operation.

The operation of the apparatus may also be so constructed that, when the plastic roll 16 is at the corner of the bale, the plastic roll can be driven back and forth in a horizontal plane near the corner of the bale for some time to allow a better lap-over of the plastic on the end and envelope of the bale. Similarly, by changing the relative speeds of the rotary motion of the bale and that of the wrapping arm, it is possible to have the plastic film overlapped in different ways on the bale.

In addition, instead of a single plastic roll, the apparatus be provided with two plastic rolls 16, each being mounted either at the end of a separate wrapping arm or at the ends of a common double wrapping arm. A double wrapping arm has a shape resembling an inverted letter U, an individual wrapping arm forming one half of it. In this case, the plastic rolls 16 are caused to start out simultaneously from opposite corners of the bale and the movements of the plastic rolls are synchronized with respect to each other. FIG. 3 illustrates a situation like this. It shows a plastic film 22 at the left-hand rear corner of the bale as seen in the direction of observation of the figure, and correspondingly a plastic film 21 which has been stretched across the front end of the bale and is now at the right-hand front corner, both of which plastic films are now passing over the corner of the bale. Each plastic roll is driven from one corner of the bale to the other, and the plastic film may be wound with half the amount of overlap compared with the use of a single plastic roll. This produces a very good and fast wrapping result. Another way of controlling the wrapping operation is to start driving the plastic rolls from the middle part of the bale with a normal overlap. In this case, the plastic rolls move toward opposite corners of the bale, one in front of the bale and the other behind it. With each plastic roll, only one corner of the bale is now wrapped. In this case, too, the operation is very fast because the distance to be covered by each roll is shorter than in the case of a single plastic roll. For each plastic roll, separate guide and pressing devices 19 and 20 are needed, placed symmetrically on opposite sides of the bale.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A procedure for wrapping a bale of hay or straw with plastic film, the bale having a substantially vertical end surface and an envelope surface, the procedure comprising the steps of:

wrapping at least one layer of plastic film wound off from at least one plastic roll provided in the wrapping apparatus around the end surface of the bale to only partially enclose the end surface of the bale;

wrapping a corner between the envelope surface and the end surface of the bale, while rotating the bale an axis of rotation of the plastic roll being held in a substantially horizontal position while the bale is rotated so that the plastic film being stretched on the bale from the plastic roll is caused to bend over the corner of the bale partly onto the envelope surface and partly onto the end surface of the bale.

2. The procedure as defined in claim 1, wherein in the first wrapping step, at least one lap turn of plastic film is wrapped about the bale by revolving a wrapping arm about the bale substantially in a horizontal plane while the axis of rotation of the plastic roll is in a substantially upright position, and that in the second wrapping step, with the axis of rotation of the plastic roll in a substantially horizontal position, the bale is rotated about its horizontal axis and the plastic film is wound about the bale so that the file is first stretched over a first corner of the bale partly onto the end surface and partly onto the envelope surface of the bale, whereupon all of the envelope surface of the bale is wrapped with plastic film by moving the plastic roll in a substantially horizontal plane toward a second end of the bale and winding the plastic film with a suitable overlap, and finally the plastic film is stretched over a second corner at the second end of the bale partly onto the envelope surface an partly onto the second end surface, and that in a third step in the wrapping, at least one layer of plastic film is wrapped about the bale by revolving the wrapping arm in a substantially horizontal plane while the axis of rotation of the plastic roll is in a substantially upright position.

3. The procedure as defined in claim 1, wherein two plastic rolls are disposed on opposite sides of the bale, the bale having two end surfaces, in the first wrapping step, at least one lap turn of plastic film is wrapped around the bale by revolving the plastic rolls in a substantially horizontal plane while the axis of rotation of the plastic rolls is in a substantially upright position, and in the second wrapping step, with the axis of rotation of the plastic rolls in a substantially horizontal position, the bale is rotated about its horizontal axis and the plastic film is wound about the bale that the file is first stretched over the corner of the bale closest to each roll partly onto one of the end surfaces and partly onto the envelope surface of the bale, whereupon the entire envelope surface of the bale is wrapped with plastic film by moving the plastic rolls in a substantially horizontal plane toward the bale end farthest away from each plastic roll and winding the plastic film with a suitable overlap, and finally the plastic film is stretched over the farther corner of the bale partly onto the envelope surface and partly onto one of the end surface and then at least one layer of plastic film is wrapped about the bale by revolving the wrapping arm in a substantially horizontal plane while the axis of rotation of the plastic rolls is in a substantially upright position.

4. The procedure as defined in claim 1, wherein when the plastic film is being wound over a corner of the bale, the horizontal axis of rotation of the bale and the axis of rotation of the plastic roll are in a substantially horizontal position but in an oblique position relative to reach other.

5. The procedure as defined in claim 1, wherein during the wrapping of the end surface, the plastic roll is rotated on an arm around the bale, an axis of rotation for the arm being vertical and intersecting the bale.

6. The procedure as defined in claim 5, further comprising the step of wrapping the envelope surface of the bale after the step of wrapping the corner with the bale being rotated about its horizontal axis.

7. The procedure as defined in claim 6, wherein the plastic roll has a longitudinal axis which is vertical during the wrapping of the end surface of the bale and the longitudinal axis of the plastic roll is horizontal during the wrapping of the envelope surface.

8. The procedure as defined in claim 7, wherein the plastic roll is pivotally mounted on the arm and wherein the arm encircles the bale during the wrapping of the end surface.

* * * * *

UNITED STATES PATENT AND TRADEMARK OFFICE
CERTIFICATE OF CORRECTION

PATENT NO. : 6,848,238 B2
DATED : February 1, 2005
INVENTOR(S) : Omni Korhonen and Matti Sirkka It is certified that error appears in the above-identified patent and that said Letters Patent is hereby corrected as shown below:

<u>Title page,</u>
Item [76], Inventors, correct the name of the first named inventor from
"Omni Korhonan" to -- Omni Korhonen --.

Signed and Sealed this

Seventh Day of June, 2005

JON W. DUDAS
*Director of the United States Patent and Trademark Office*